United States Patent
Bouchette

[11] Patent Number: 6,110,848
[45] Date of Patent: Aug. 29, 2000

[54] HYDROENTANGLED THREE PLY WEBS AND PRODUCTS MADE THEREFROM

[75] Inventor: Michael Paul Bouchette, Sherwood, Wis.

[73] Assignee: Fort James Corporation, Deerfield, Ill.

[21] Appl. No.: 09/169,067

[22] Filed: Oct. 9, 1998

[51] Int. Cl.[7] .................................. B32B 5/26; B32B 7/08
[52] U.S. Cl. ................... 442/384; 442/381; 442/387; 442/389; 442/408; 442/412
[58] Field of Search ..................................... 442/387, 384, 442/389, 408, 412

[56] References Cited

U.S. PATENT DOCUMENTS

| | | |
|---|---|---|
| 4,775,579 | 10/1988 | Hagy et al. . |
| 4,808,467 | 2/1989 | Suskind et al. . |
| 4,902,564 | 2/1990 | Israel et al. . |
| 5,026,587 | 6/1991 | Austin et al. . |
| 5,151,320 | 9/1992 | Homonoff . |
| 5,246,772 | 9/1993 | Manning . |
| 5,393,599 | 2/1995 | Quantrille et al. . |
| 5,413,849 | 5/1995 | Austin et al. . |
| 5,587,225 | 12/1996 | Griesbach et al. . |

*Primary Examiner*—Terrel Morris
*Assistant Examiner*—Norca L. Torres

[57] ABSTRACT

A three ply sandwich structured hydroentangled web is disclosed. The top and bottom plies of this web comprise long synthetic fibers having a fiber length of about 30 to 100 mm and the middle ply comprises cellulosic fibers having a fiber length of about 1 to 8 mm. The middle layer cellulosic fiber can optimally be wholly or partially replaced with short synthetic or other natural fibers having a fiber length of about 6 to 27 mm.

These hydroentangled webs are useful in the manufacture of towels, wet wipes, industrial wipes and medical gowns.

22 Claims, 7 Drawing Sheets

---- Long Fiber Synthetics
--- Short Fiber Wood Pulp
--- Long Fiber Synthetics

Typical wet laid Hydroentangled web making process

FIG. 1

Typical wet laid papermaking process

Typical carding line (Dry-laid) showing hydroentanglement pre-bonding

Typical Off-line Hydroentanglement process marrying a roll of nonwovens (long fiber) with a roll of paper (short fiber)

Typical in-line process of three ply hydroentangled system showing carding as long fiber nonwovens web formation technique, and adding paper as middle ply.

HYDROENTANGLED THREE PLY WEBS AND PRODUCTS MADE THEREFROM

BACKGROUND OF THE INVENTION

This invention relates to novel three ply sandwich structured hydroentangled webs having long synthetic fibers on the top and bottom ply and short wood pulp (cellulosic fiber), other short natural fiber, short synthetic fiber, or mixtures of short cellulosic fibers, other short natural fiber and short synthetic fiber in the middle ply. The webs of my invention have the hand feel and properties of the much more costly 100% synthetic fiber products while comprising about 40 to 90 weight percent wood pulp or related cellulosic fiber.

BACKGROUND

Prior art has not utilized a three ply structured web having two outer plies comprising long synthetic fibers while the inner ply comprises short cellulosic fibers. The weight percent of the cellulosic fiber is up to 90 weight percent and thus using my invention three ply webs are obtained having the hand feel of the expensive synthetic fiber webs while having a cost structure approaching regular short fiber cellulosic webs.

My invention meets an urgent need for a low cost product having good hand feel. Representative prior art includes the following United States patents: Hagy et al U.S. Pat. No. 4,775,579; Suskind et al U.S. Pat. No. 4,808,467; Israel et al U.S. Pat. No. 4,902,564; Austin et al U.S. Pat. No. 5,026,587, Homonoff et al U.S. Pat. No. 5,151,320; Manning U.S. Pat. No. 5,246,772; Quantrille et al U.S. Pat. No. 5,393,599; Austin et al U.S. Pat. No. 5,413,849; and Griesbach et al U.S. Pat. No. 5,587,225.

None of the prior art references cited above suggest or disclose my novel three ply sandwich structured hydroentangled web having long synthetic fibers on the top and bottom and short cellulosic fibers or optionally short synthetic fibers in the middle ply. None of the references suggest my product that has the excellent hand feel of expensive synthetic fibers while maintaining the low cost structure similar to wood pulp products.

My invention is a laminar product having superior performance, hand feel and cost attributes to the products disclosed in the prior art.

Hydroentanglement is well known in the industry as a binderless way of bonding fibers together. It operates through a process that entangles individual fibers within a web by the use of high-energy water jets. Fibrous webs are passed under specially designed manifold heads with closely spaced holes which direct water jets at pressures up to 150 bar, and higher. The energy imparted by these water jets moves and rearranges the fibers in the web in a multitude of directions. As the fibers escape the pressure of the water streams, they move in any direction of freedom available. In the process of moving, they entangle with one another providing significant bonding strength to the fibrous webs, without the use of chemical bonding agents.

Prior art in hydroentanglement has primarily focused around fibrous substrates prepared either by the wet laid process, or by the dry laid process. In the wet laid process (shown in FIG. 1), the furnishes used are typically cellulosic or wood pulp, mixed with some other natural or synthetic fibers. The typical length of cellulosic wood pulp fibers is 1–3 mm. Although the cellulosic wood pulp fibers represent a low cost furnish, the fiber length is too short to gain much advantage from hydroentangling. The natural or synthetic fiber lengths are still limited by the ability of the wet laid paper machines to handle and form them into a web. A typical wet laid machine can utilize natural or synthetic fiber lengths in the 6–12 mm region. Specially designed machines and using selective additives may be able to process synthetic fibers having a length of up to 27 mm. Although fibrous webs formed from fiber lengths of 6–27 mm do show a significant advantage over the shorter wood pulp fibers when it comes to entangling, they still do not measure up to the advantages of webs formed by the dry laid process, such as carding, which utilizes fibers of 35 to 45 mm and longer. Although arguments have been made by experts in the field that it is the fiber ends which entangle, and therefor one might think that more shorter fibers would work better than fewer longer fibers, it has also been readily shown that approximately 35–45 mm in fiber length is preferred for maximum entanglement strength return.

In the case of wet laid nonwovens, which consist of cellulosic wood pulp fibers and synthetic fibers, the benefits to the process are primarily in the cost advantages of the lower cost wood pulp fibers used. But the primary disadvantage is the fact that the necessarily short fibers used reduce the overall final strength of the hydroentangled product. In the case of hydroentangled carded webs, the long synthetic fibers produce superior strength and hand feel in final products, but the cost of a totally synthetic fiber furnish is often prohibitive.

In order to reduce the cost of the hydroentangled dry laid or carded products, the prior art has reverted to adding a sheet of paper to a carded web, and hydroentangling the two together. This process reduces the overall materials cost of the final product, and produces a product which is stronger than the wet laid hydroentangled product, and is weaker than the hydroentangled totally synthetic long fiber furnish carded product.

However, there are still some significant gaps in performance and/or cost of these middle of the road or hybrid products. It has been shown that when paper is laid on top of the nonwoven web and subjected to hydroentanglement, there is significant wood pulp fiber loss due to the splattering caused by the direct impact of the water jets. It has further been shown that when the paper is used as the bottom layer of the laminar product, the wood pulp fibers are driven into the support or carrier wire, which causes not only fiber loss in the product, but which also plugs the wire, making the system inoperable. And it has been still further shown that webs produced from a two ply structure of this sort end up with a two-sided hand feel. Generally speaking, hydroentangled nonwovens are used to replace woven or knitted cloth products, and a two-sided hand feel is perceived as a lesser quality product, thereby limiting the sales or usefulness of such products.

In my invention, I have solved the cellulosic wood pulp fiber loss, prevented plugging of the carrier wire, and provided a final product that is cost effective and has no side-to-side hand feel difference. In my invention, I add the short wood pulp fibers as a sheet of paper or a formed air laid web into the middle of a three ply structure. By using long fiber (typically 40 mm or greater) synthetics as the outside two plies, I am able to maximize the desirable hand feel associated with synthetics compared to wood pulp. By sandwiching the wood pulp between the two synthetic layers, I am able to minimize the loss of wood pulp fibers in the hydroentanglement process. And by sandwiching the wood pulp fibers in the middle of the sheet, I am able to use a wider variety of low cost wood pulp, such as recycled fibers, because the visual aesthetics of the wood pulp are masked. And by using long fiber synthetics, I am able to achieve superior strength properties when compared to the products made from the wet laid process.

SUMMARY OF THE INVENTION

My invention relates to low cost, low sidedness, good hand feel three ply sandwich structured hydroentangled webs. The top and bottom ply of the entangled web comprise long synthetic fibers. The middle layer comprises short length cellulosic fiber or optionally short length synthetic fiber or other short natural fibers or mixtures of short length cellulosic fiber, other short natural fibers and short length synthetic fiber. The great advantage of my three ply web is that it comprises about 40 to 90 weight percent cellulosic fiber and only about 10 to 60 weight percent synthetic fibers while having the hand feel and other optimum properties of an all synthetic web. My invention has answered a long felt need in the art for a product having the properties of synthetic fibers while having the cost structure advantages of wood pulp or cellulosic fiber derived products.

DETAILED DESCRIPTION OF THE INVENTION

I have invented a three ply sandwich structured hydroentangled web exhibiting low sidedness and good hand feel. The web has long synthetic fibers on the top and bottom ply, and the middle ply is occupied by short cellulosic fibers or a mixture of short cellulosic fibers and optionally short synthetic or other natural fibers, wherein the synthetic fibers in the outer plies have a length in the range of about 30 to 100 mm and the cellulosic fiber in the middle range has a length of about 1.0 to 8.0 mm and the optionally added short synthetic or other natural fibers have a length of about 6 to 27 mm. The usual cellulosic fibers have a length of about 1 to 3 mm. The great advantage of my three ply web over the prior art products is that I can obtain the quality of synthetic fibers while having a web comprised of 40 to 90 weight percent of inexpensive cellulosic fibers such as wood pulp or recycled fiber. Preferably the web comprises 60 to 80 weight percent of cellulosic fibers. In an alternative embodiment, the three ply hydroentangled web of this invention has as the middle ply short synthetic fibers comprising about 20 to 100 weight percent, preferably 20 to 80 weight percent of the middle layer of the middle layer. Advantageously the three ply hydroentangled web of this invention is converted to a towel, wet wipes, industrial wipes and medical gowns. Suitable synthetic fibers include polyolefins, regenerated cellulose, polyethylenes, polypropylenes, polyesters, polyimides, polyamides, inorganic polymers, silica polymers, carbon fibers, and mixtures of these. Suitable cellulosic fibers include wood pulp and cotton. A suitable natural fiber is wool.

Table 1 illustrates the strength benefits of hydroentangled products using long synthetic fibers. Samples 2, 4, 6, and 25 are competitive products found in the market. Sample 2 has the longest of synthetic fibers found in the sampling, and has a 100% synthetic fiber furnish. Compared to the samples of my invention (Hx4A, Hx5, and Hx10), the lower MD tensiles and wet mullen burst values of sample 2 are due to the shorter synthetic fiber length. Sample 4 has even shorter synthetic fiber lengths, like those usually associated with a wet laid process, and in that sample 5% of a bicomponent fiber has been used to try to achieve additional strength. Sample 4 illustrates the deleterious result of the effect on strength of the hydroentangled product exerted by short fiber wood pulp. Sample 4, containing 5% bico for additional strength, and also containing 44% wood pulp, achieved comparable strengths to sample 2, but only at a basis weight increase of over 87%. This clearly confirms the negative effect on strength of the web caused by short fiber wood pulp. Sample No. 6, containing 73% wood pulp, has a much higher basis weight to overcome the detrimental effect on strength properties exerted by short length cellulosic fiber such as wood pulp. Sample No. 25 with 70% wood pulp, but at a significantly lower basis weight, shows a very large loss in strength.

Samples Hx4A, Hx5, and Hx1O, all of which represent the three ply structure of my invention clearly show that long synthetic fibers, when used with wood pulp contents of 60–70%, still yield superior strengths. And furthermore, panel testing between two and three ply properties of comparable furnish and strength confirms that consumers always preferred the three ply structure of my invention for hand feel.

TABLE 1

| | | | | | | |
|---|---|---|---|---|---|---|
| | HYDROENTANGLED STRENGTH COMPARISONS | | | | | |
| SAMPLE I.D. | BASIS WEIGHT gr/m² | FURNISH | SYNTHETIC FIBER LENGTH (MM) | WET MULLEN BURST (PSI) | MD DRY TEN gr/in | MD WET TEN gr/in |
| 2 | 40.01 | 84% Rayon | 26 | 18 | 2792 | 2280 |
| | | 16% Polyester | 28 | | | |

TABLE 1-continued

HYDROENTANGLED STRENGTH COMPARISONS

| SAMPLE I.D. | BASIS WEIGHT gr/m² | FURNISH | SYNTHETIC FIBER LENGTH (MM) | WET MULLEN BURST (PSI) | MD DRY TEN gr/in | MD WET TEN gr/in |
|---|---|---|---|---|---|---|
| 4 | 74.9 | 49% Wood Pulp<br>46% Rayon<br>5% Bico | —<br>7.5<br>5.5 | 21.4 | 2839 | 2908 |
| 6 | 81.3 | 73% Wood Pulp<br>27% Polypropylene | —<br>10.8 | 35 | 5712 | 4353 |
| 25 | 60.2 | 70% Wood<br>30% Rayon | —<br>10.4 | 8 | — | 820 |
| Hx4A | 55 | 60% Wood Pulp<br>40% Polyester | —<br>40 | 64 | 5175 | 3900 |
| Hx5 | 59 | 65% Wood Pulp<br>35% Polyester | —<br>40 | 65 | 4710 | 3470 |
| Hx10 | 73 | 70% Wood Pulp<br>30% Polyester | —<br>40 | 80 | 5460 | 4570 |

The cellulosic fibers used to form the web of the present invention include recycled fibers and/or cellulosic fibers commonly referred to as wood pulp fibers, liberated in the pulping process from softwood (Gymnosperms or coniferous trees) and hardwoods (angiosperms or deciduous trees). Cellulosic fibers from diverse material origins may be used to form the web of the present invention including non-woody fibers liberated from sugar cane, bagasse, sabai grass, rice straw, banana leaves, paper mulberry (i.e., bast fiber), abaca leaves, pineapple leaves, esparto grass leaves, and fibers from the genus Hesperaloe in the family Agavaceae. Also recycled fibers which may contain any of the above fiber sources in different percentages can be used in the present invention. Suitable fibers are disclosed in U.S. Pat. Nos. 5,320,710 and 3,620,911, both of which are incorporated herein by reference.

Cellulosic fibers can be liberated from their source material by any one of the number of chemical pulping processes familiar to one experienced in the art including sulfate, sulfite, polysulfite, soda pulping, etc. The pulp can be bleached if desired by chemical means including the use of chlorine, chlorine dioxide, oxygen, etc. Furthermore, papermaking fibers can be liberated from source material by any one of a number of mechanical/chemical pulping processes familiar to anyone experienced in the art including mechanical pulping, thermomechanical pulping, and chemi thermomechanical pulping. These mechanical pulps can be bleached, if one wishes, by a number of familiar bleaching schemes including alkaline peroxide and ozone bleaching. The type of furnish is less critical than is the case for prior art products. In our process coarse hardwoods and softwoods and significant amounts of recycled fiber can be utilized to create useful products.

Figure 1:
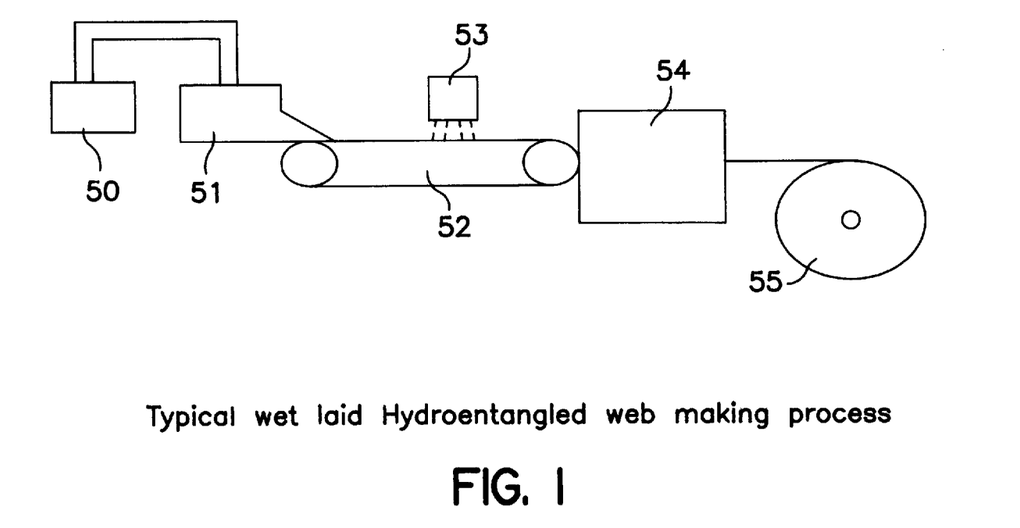
FIG. 1 illustrates a prior art wet laid hydroentangled web making process.

FIG. 1 illustrates a representative design of a wet laid fibrous web with in-line hydroentanglement. The fibers are opened, treated, blended, diluted, and refined as necessary in the process identified as (50). From this system they end up in the head box (51) which deposits the fibers onto the forming table and forming wire (52). The forming table and forming wire (52) may be of a number of various designs. Following the formation, the web is then subjected to the hydroentanglement water streams at (53). The hydroentanglement is not necessarily done over the forming wire, but a carrier wire of some kind is required. Depending upon the final web properties desired it may be necessary to run the web under multiple hydroentangling heads, and/or it may be desirable to turn the web over and re-entangle from the other side. Following the final hydroentanglement, the web is dried (54) in any number of conventional drying opportunities, such as steam heated can dryers, TAD (through air drying), Radiant Heat (such as Infra-Red), and the like. And finally, the web is wound up in a parent roll (55) for storage or subsequent processing, slitting, etc. The process shown in FIG. 1 uses the in-line combination of wood pulp or other natural fibers, and short (6–27 mm) synthetic or other natural fiber mixed together before the web is formed.

Figure 2:
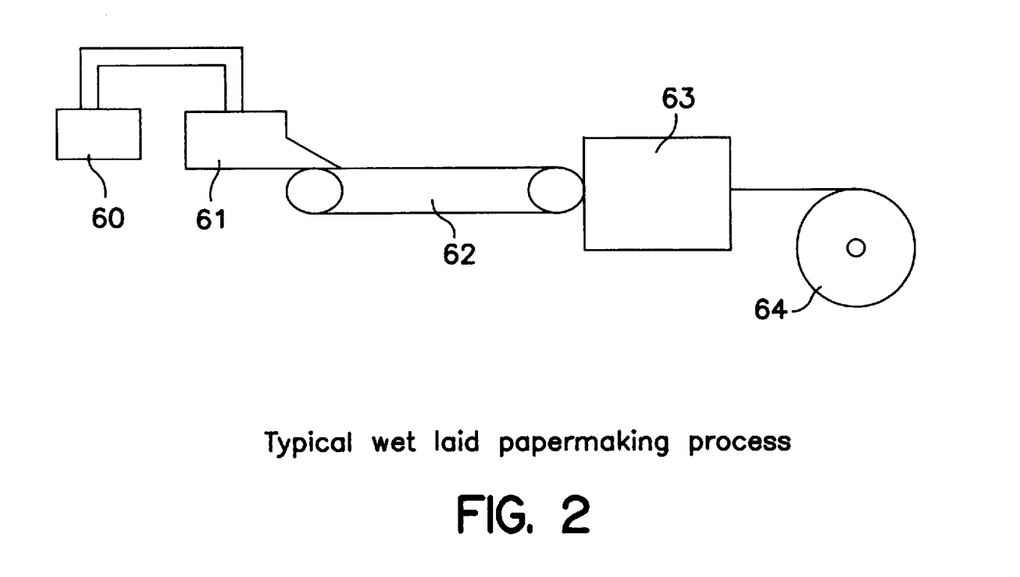
FIG. 2 illustrates a wet laid web making process without entanglement.

FIG. 2 illustrates a representative design of a wet laid papermaking operation with no hydroentanglement. The wood pulp fibers are separated, treated, blended, diluted and refined as necessary in the process identified as (60). From there they are transported to the forming head (61) where they are deposited on the forming wire (62). Again, the forming head design and the forming table design may be any of many conventional technologies. The web is then dried in some type of conventional dryer (63) and wound up in a parent roll (64). In FIG. 2, this roll of paper is then transported to a facility wherein it is married with a dry laid nonwoven web, such as a carded web, through the hydroentanglement process.

Figure 3:
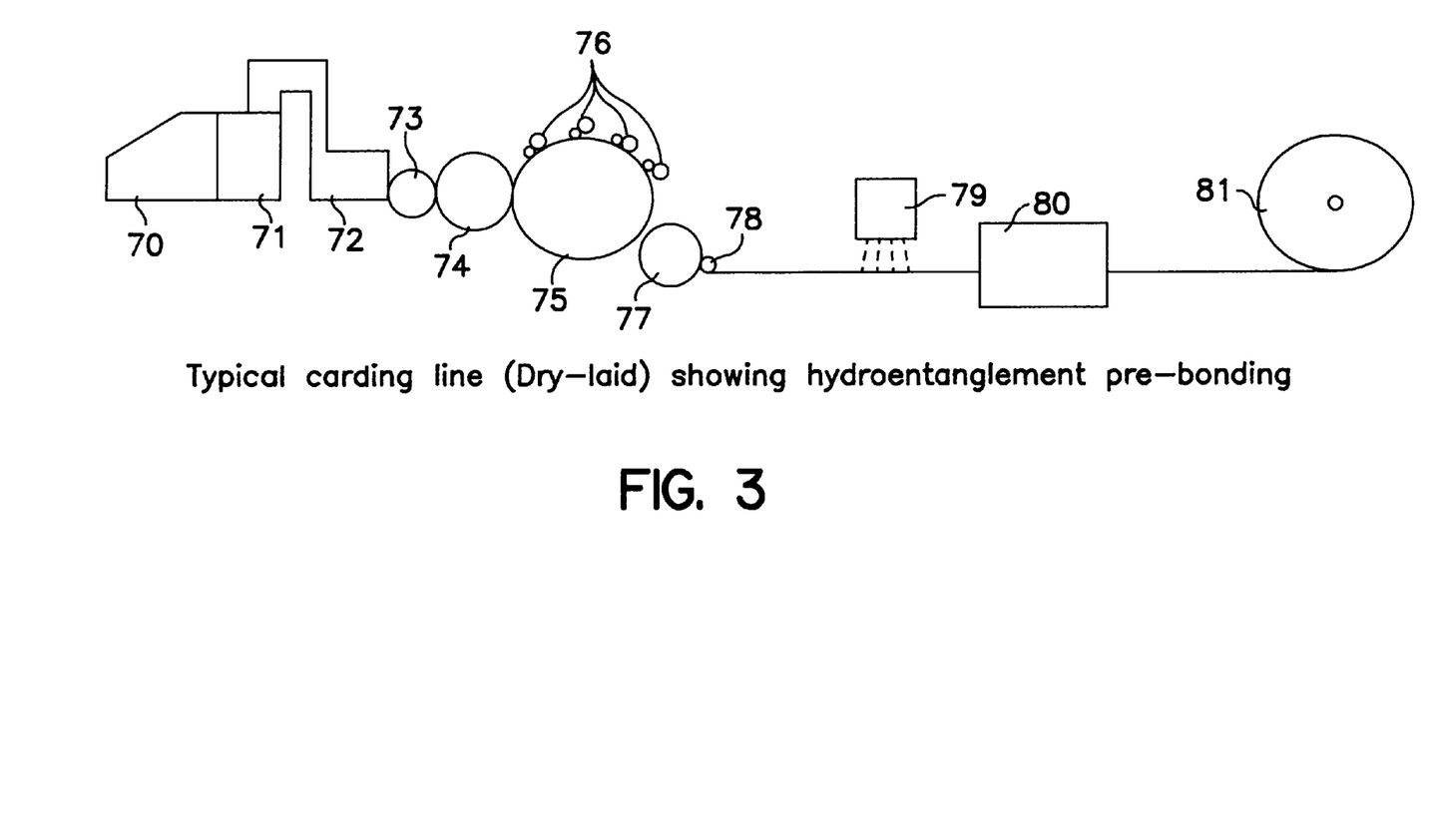
FIG. 3 illustrates a dry laid process, such as a card line.

FIG. 3 illustrates a representative view of a typical dry laid operation, such as a card line. The web formed in this type of process utilizes the longer synthetic fibers (approximately 35 to 45 mm, or longer such as 45 to 100 mm), and it is this web which would form the outside two plies of my invention. In FIG. 3, the process flow is such that this web is pre-entangled prior to its inclusion within the three ply final structure and is then processed with off line final hydroentanglement. If an off-line final hydroentanglement process is used, and the synthetic webs are not pre-entangled, their internal integral strength must be at least partially developed in some other manner so as to facilitate the web being wound up within the process of its initial manufacture, and then unwound at a later time in the process of marrying the three webs together and doing the final hydroentanglement. If preentanglement is not used, some of the acceptable alternatives for strength development are a light resin bonding (typically latex), a less severe type of hydroentanglement known in the industry as aperturing, or an interleaving of the unbonded weak web with a sheet of carrier paper. In FIG. 3, the synthetic fibers are pre-opened in the bale opener (70). They are then transported to the fine opener (71). Here the opening process is continued further until the fibers are separated and declumped sufficiently for final processing and forming. The fibers are then transported to the chute feed (72) which meters them at a uniform rate and volume into the feed roll (73) and then the lickerin roll (74) to transfer the fibers in a separated, uniform and controlled manner to the main cylinder (75). Here they are repeatedly combed and stripped from the main cylinder (75) by the worker and stripper rolls (76). The web is then transferred to the doffer roll (77). From the doffer roll (77) the web is peeled off by the peeler roll (78). In FIG. 3, the next processing step shown is the pre-entanglement (79). Following the pre-entanglement (79) the web is dried (80) and wound up into a parent roll (81). If, as stated earlier, the nonwoven web is not pre-entangled and the final hydroentanglement process is off-line from the nonwoven web formation line, the preentanglement step (79) would be replaced by some type of other bonding, such as resin bonding or aperturing. In both cases, the relative process position of the other bonding would be the same in that they would follow web formation, and be followed by drying (80). One exception to this would be if the web were needle punched to add strength. Needle punching is a totally dry process, and no drying (80) would then be required.

Other processes, such as melt spinning, spun bonding and co-forming could also provide a long fiber base web for use in hydroentangling, but the most common process is carding, as is shown in FIG. 3.

Figure 4:
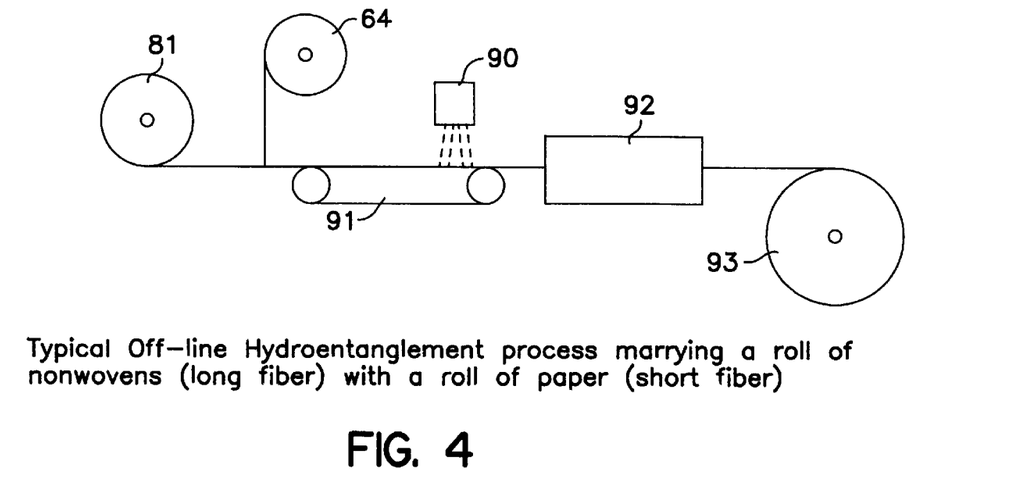
FIG. 4 represents an off-line line process suitable for producing a two ply web of prior art by combining and hydroentanglement of the webs formed according to the processes described in FIGS. 2 and 3.

FIG. 4 illustrates an off-line process for marriage and hydroentanglement of the webs formed via the processes shown in FIGS. 2 and 3. This process produces a two ply, high-sidedness web of the prior art. In this process, the roll of long fiber dry laid nonwoven (81) as described in FIG. 3 is unwound onto a carrier wire or support backing. A roll of paper (64), as described in FIG. 2 is unwound on top of the nonwoven on a support table or in some similar fashion (FIG. 4, 91). The two webs together are then passed under a hydroentanglement head or heads (90), through a dryer system (92) and finally wound up into a parent roll (93).

The long fiber nonwoven (81) in FIG. 4 may be pre-entangled, as would be shown in FIG. 3, or it may be lightly bonded by resin bonding or aperturing, or it may be interleaved with a carrier paper in order to give it sufficient strength and integrity for unwinding and transfer processing.

The process flow in FIG. 3 could also serve to illustrate a partial in-line way of making a two-sided product of the prior art. The paper (FIG. 2, 64) could be added after the peeler roll (78) and before the hydroentanglement (79). In this case, the hydroentanglement (79) would become the primary entanglement instead of a pre-entanglement. Or, if pre-entanglement is desired, then paper could be added after the pre-entanglement (79) but before the final entanglement and subsequent dryer (80).

Additional entanglement, or entanglement from the other side of the web may also be used, but entanglement from the other side of the web increases the potential for fiber loss and carrier wire plugging.

The hydroentangled webs made by these processes basically represent the state of the art in which a strong two ply product is made, but which has a two sided feel to it, and which contributes to a significant paper fiber loss when practicing the process.

Figure 5:
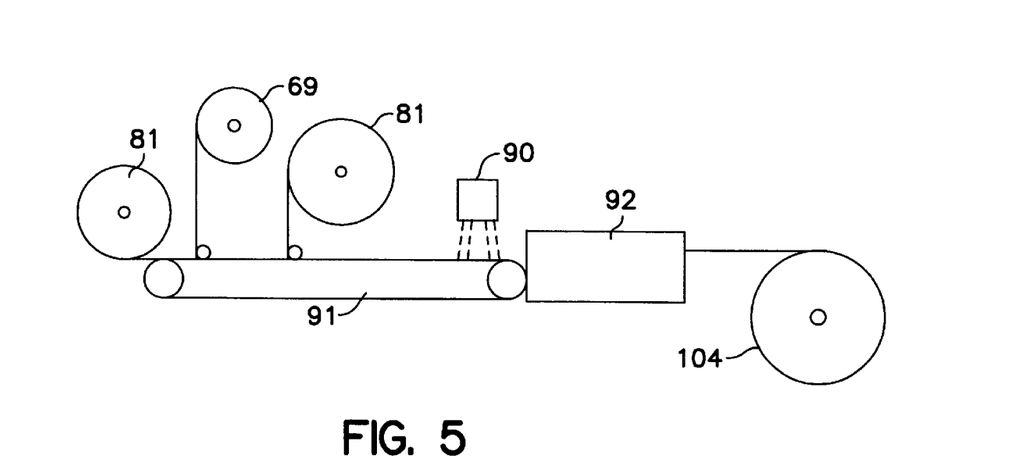
FIG. 5 illustrates an off-line process used in producing the three ply web of my invention.

FIG. 5 illustrates an off-line process used in making my invention. In this case, a roll of long fiber nonwovens (81) is unwound onto a carrier wire (91). A roll of paper (69) is then unwound on top of the nonwoven (81), and then a second roll of nonwovens (81) is unwound on top of the paper (69), effectively sandwiching the paper in-between two layers of nonwovens. This three ply structure is then subjected to hydroentangling (90), with single or multiple heads, and from one or both sides. And the hydroentangled product is then dried (92) and wound up into final parent roll (104). This product of my invention is superior in that it has uniform improved hand feel on both sides, and has the cost reduction related to wood pulp usage in the inner ply, while also retaining more of the wood pulp fiber in the inner ply while passing through the hydroentanglement stage.

Figure 6:
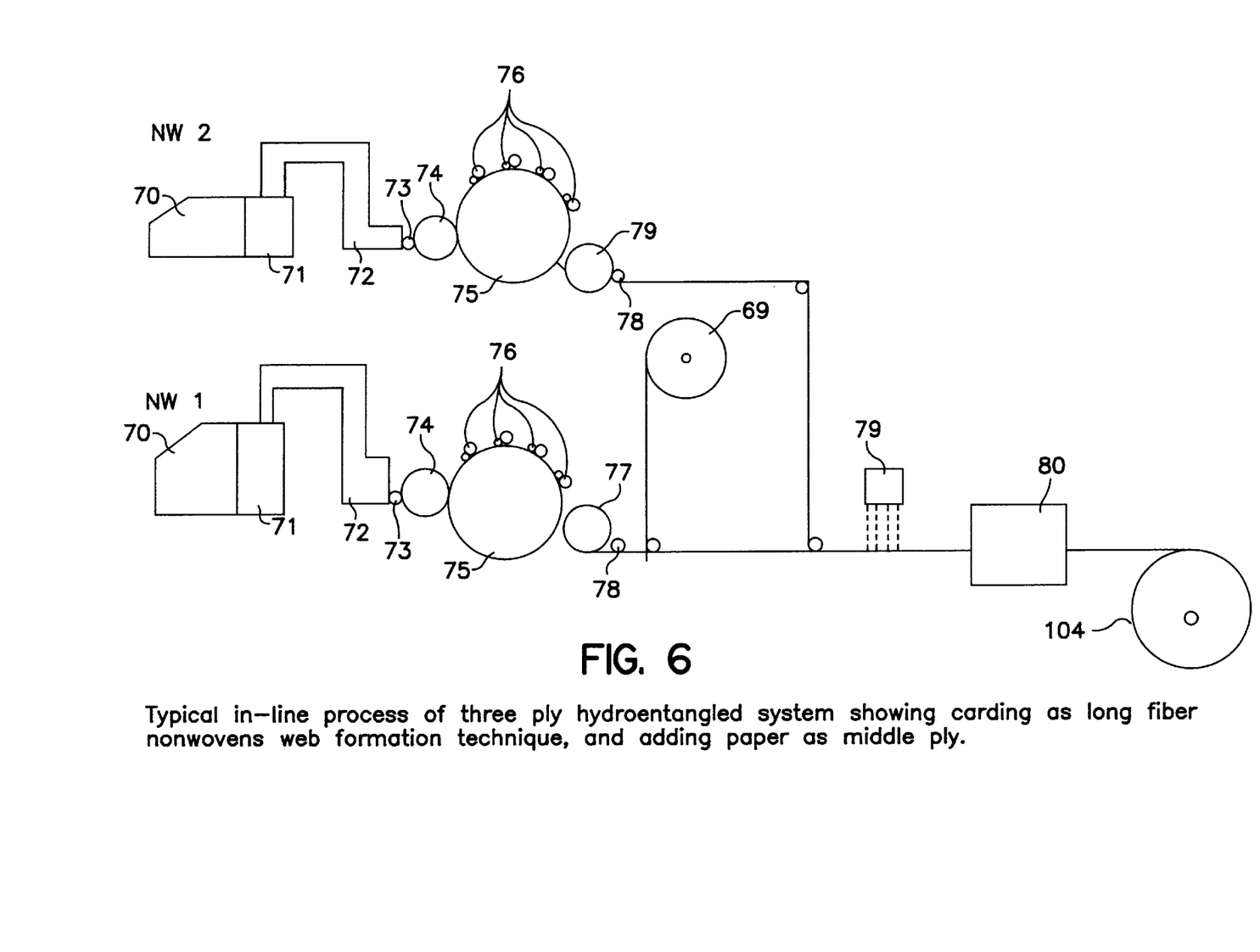
FIG. 6 illustrates an in-line process for producing the three ply web of my invention.

FIG. 6 shows my invention as an in-line process whereby the dry-laid carded webs are manufactured and the paper web is added directly in-line within the process flow. In this case, the nonwoven webs and web forming equipment is made in the same manner as in FIG. 3. Following the nonwovens web removal from the NW 1 peeler roll (78), the paper roll (69) is unwound on top of the nonwoven web. Immediately following this step, the second nonwovens web is taken from NW 2 peeler roll (78), as formed and is laid on top of the paper web, and the 3 layer composite is hydroentangled (79) and dried (80) and wound up into a parent roll (104). Alternative process configurations include pre-entangling the NW 1 and/or NW 2 web after their peeler rolls (78) but before the addition of the paper (69) in order to develop superior strength at minimum energy requirements for the long synthetic fiber layers.

Figure 7:
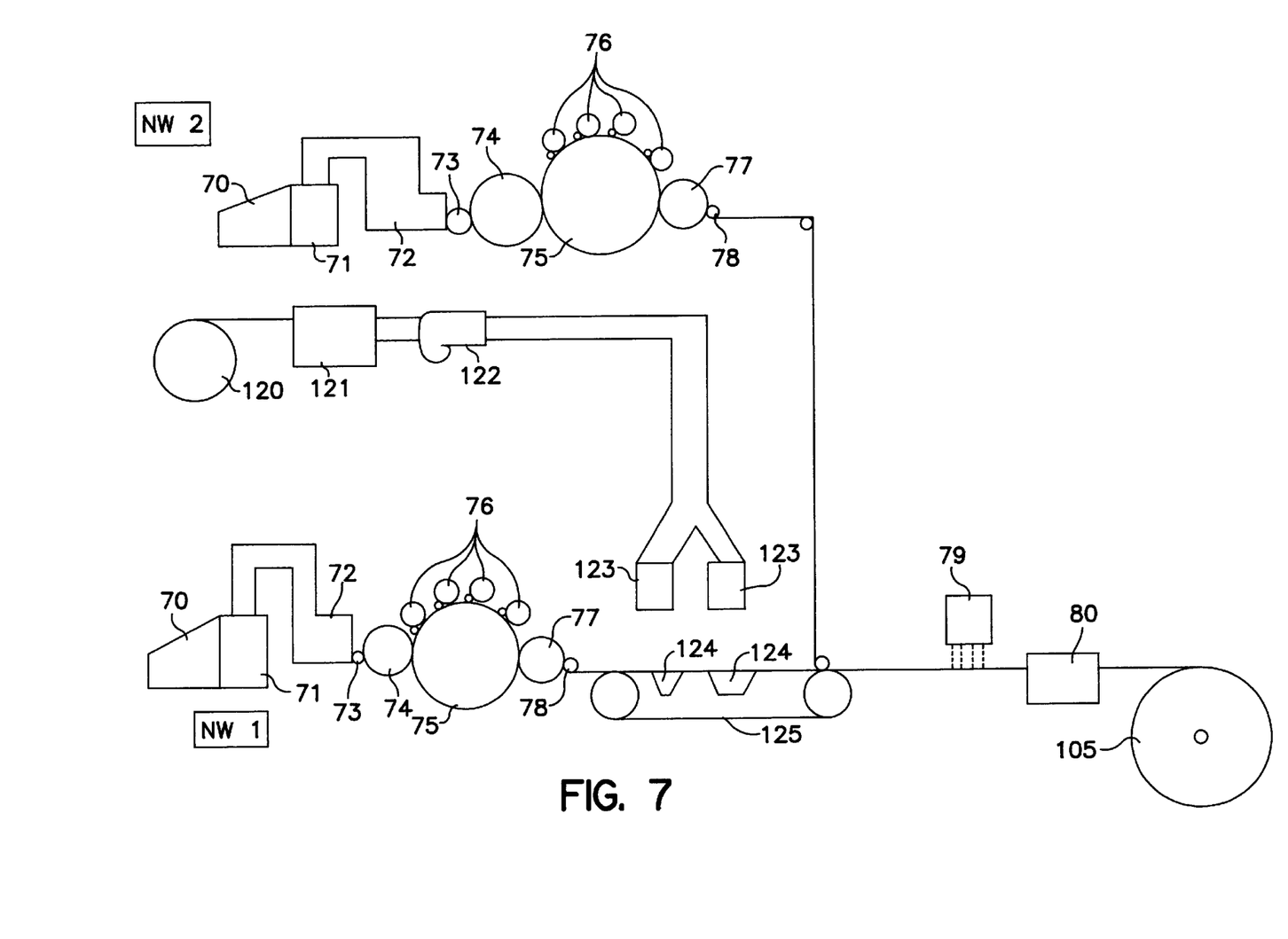
FIG. 7 illustrates an in line process for the manufacture of the three ply hydroentangled web of this invention.

FIG. 7 illustrates an in-line process whereby the dry-laid carded webs are manufactured and whereby the wood pulp fibers are added through an air laid nonwovens process. The long fiber synthetic web is first formed in the conventional manner through the NW 1 process as shown previously and carried onto a forming wire (125). Wood pulp (120) is fed into a hammermill (121) wherein the fibers are individualized and sent via a transport fan (122) to the forming heads (123). The fibers are blown through the forming heads (123) onto the nonwovens web from NW 1 already on the forming wire (125), and formation is assisted by a vacuum suction (124) under the forming wire (125). The second long fiber nonwovens web from NW 2 is laid down on top of the wood pulp/long fiber nonwovens composite web, and the three layer structure is passed through the hydroentanglement station (79), dried (80), and wound up into a parent roll (105). Multiple forming heads (123) and vacuums (124) are shown, but a single head and vacuum is also acceptable, depending on the process line speeds, basis weights required, and system forming capacities. The nonwoven webs in NW 1 and/or NW2 may also be subjected to preentanglement following the removal from their peeler rolls (NW78) and before the addition of the wood pulp fibers on the forming wire (125).

Figure 8:
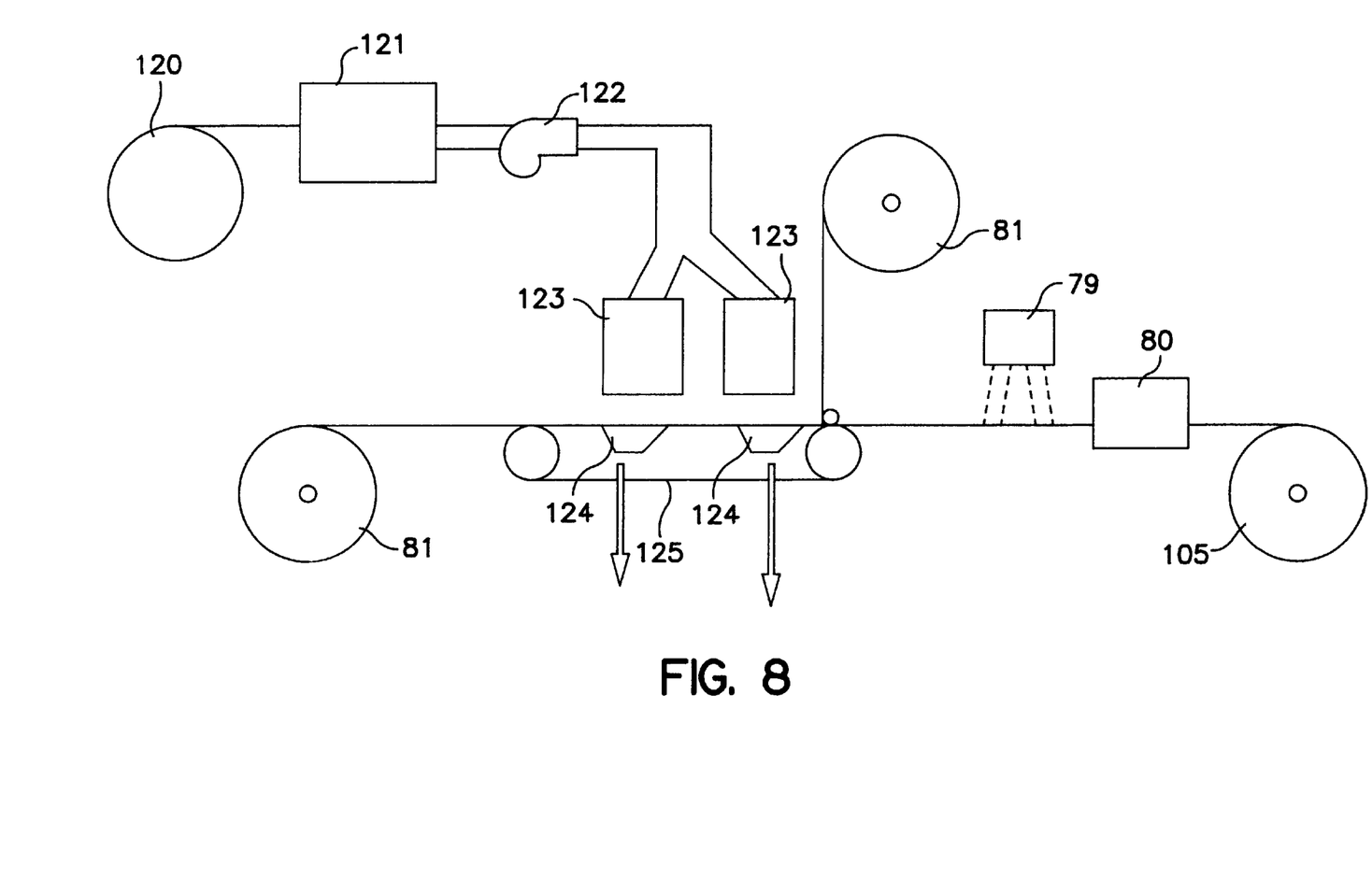
FIG. 8 illustrates a process for producing the three ply hydroentangled web of this invention.

FIG. 8 illustrates a process in which the nonwoven webs are first formed off-line (with preentanglement or some other type of bonding) and then unwound within the process to form the top and bottom plies in the three ply structure. Here, the nonwoven web (81) is unwound onto the air laid forming wire (125) wherein the wood pulp fibers (120) which have been hammermilled (121) and fan-fed (122) to the forming heads (123) are deposited on top of the nonwoven web with the aid of the vacuum assist (124). Following this, a second nonwoven web (81) is laid on top of the wood pulp fibers, and the composite is then hydroentangled (79) and wound up as a parent roll (105). As before, any number of process variations may be readily used by those experienced in the art, but the concept of the three ply structure with improved hand feel and low cost having synthetic fibers on the top and bottom layer and wood pulp or recycled fiber in the middle layer wherein the cellulosic fiber comprises about 60 to 90 weight percent of the three ply structure is the preferred embodiment of my invention.

Figure 9:
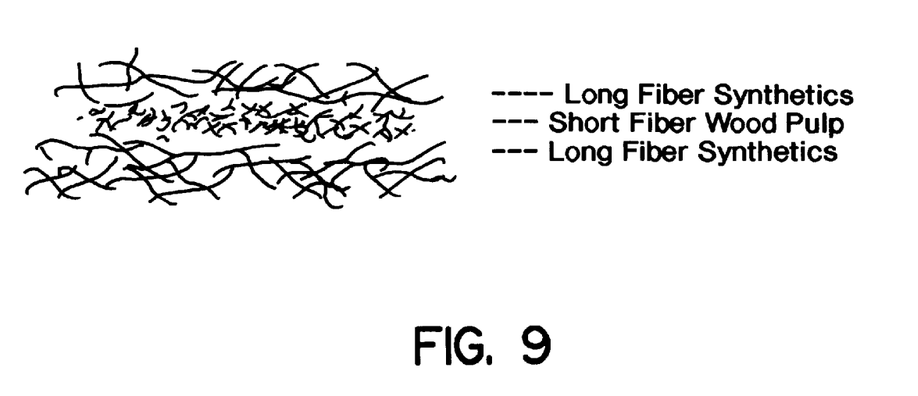
FIG. 9 illustrates the construction of the three ply hydroentangled web of this invention.

FIG. 9 shows a side view of the construction of my invention. The top ply is made from dry laid long synthetic fibers. Typical synthetic fiber length ranges from 30 mm to 80 mm, and longer. The most desirable fiber length is approximately 35 to 45 mm. The middle layer is made from short fiber wood pulp. Typical fiber lengths are 1–3 mm. For specific product needs, it may be advantageous to incorporate some short cut synthetic fibers and/or other natural fibers into this layer also, but if added within the air laid nonwovens system of web formation, maximum fiber lengths of these short synthetics would be 6–8 mm. If the middle layer of the structure is formed off-line, optionally the middle layer can be produced from the wet laid nonwovens system as described in FIG. 1. In this manner, it is possible to introduce some longer synthetic fibers (6–27 mm) in the middle layer, while retaining some wood pulp in this ply. Adding synthetic fibers reduces the cost effectiveness, but might add property improvements required for some special applications. The bottom layer would comprise long fiber synthetics (preferably 35–45— and up to 80–100 mm). The three ply composite is then hydroentangled together that drives the longer fibers from the top and bottom into the middle of the web and also reorients them to affect the overall MD/CD strength ratio. In this hydroentanglement process, the wood pulp fibers are also rearranged, but they would contribute little to the overall strength, as they are too short to add significant strength. Furthermore, the bottom layer of synthetic fibers acts as a sort of filter to prevent the wood pulp fibers from being driven through the sheet and into the waste stream. The top layer of synthetic fibers acts as a filter and a buffer to prevent the wood pulp fibers from splattering out of the web when the water streams impinge on it. The net effect is that a three ply structure is made with the benefits of wood pulp for cost; with the maximum benefits of wood pulp retention in the hydroentanglement process for cost; and with the maximum benefits of hand feel and low sidedness and strength from the long fiber synthetics on the outsides of the web.

Other embodiments of the invention will be apparent to those skilled in the art from consideration of the specification and practice of the invention disclosed herein. It is intended that the specification and drawings be considered as exemplary only with the true scope and spirit of the invention being indicated by the following claims.

I claim:

1. A three ply sandwich structured hydroentangled web exhibiting low sidedness and good hand feel having long synthetic fibers on the top and bottom ply and short cellulosic fibers or a mixture of short cellulosic and optionally short synthetic or other natural fibers in the middle layer wherein the synthetic fibers in the outer plies have a length in the range of about 30 to 100 mm and the cellulosic fiber in the middle ply has a length of about 1 to 8 mm and the optional short synthetic or other natural fibers have a length of about 6 to 27 mm.

2. The three ply hydroentangled web of claim 1 wherein about 40 to 90 weight percent of the web comprises cellulosic fibers.

3. The web of claim 2 wherein 60 to 80 weight percent of the web comprises cellulosic fibers.

4. The hydroentangled web of claim 1 wherein the middle ply comprises about 20 to 100 weight percent of the short synthetic or other natural fibers.

5. The hydroentangled web of claim 4 wherein the middle ply comprises 20 to 80 weight percent of the short synthetic or other natural fibers.

6. The hydroentangled web of claim 2 wherein the short cellulosic fibers have a length of about 1 to 3 mm.

7. The hydroentangled web of claim 1 in the form of a towel.

8. The hydroentangled web of claim 1 in the form of wet wipes.

9. The hydroentangled web of claim 1 in the form of industrial wipes.

10. The hydroentangled web of claim 1 in the form of medical gowns.

11. The web of claim 1 wherein the synthetic fiber is selected from the group consisting of polyolefins, polyethylenes, polypropylenes, polyesters, regenerated cellulose, polyimides, polyamides, inorganic polymers, silica polymers, carbon fibers and mixtures of these.

12. The hydroentangled web of claim 1, wherein the middle ply is an air laid nonwoven web.

13. The hydroentangled web of claim 1, wherein the outer plies are produced by a carding process.

14. The web of claim 1 wherein the outer plies are produced by a melt blown process.

15. The web of claim 1 wherein the outer plies are produced by a spun bound process.

16. The web of claim 1 wherein the outer plies are produced by a co-forming process.

17. The hydroentangled web of claim 1, wherein the middle ply is a conventional wet laid paper web.

18. The hydroentangled web of claim 1, wherein the middle ply is a wet laid nonwoven.

19. The web of claim 18 wherein the middle ply comprises 0–80% wood pulp, and 20–100% short synthetic fibers.

20. The web of claim 1, wherein the cellulose fibers are selected from wood pulp or cotton and mixtures of these.

21. The web of claim 1, wherein the other natural fiber is wool.

22. The hydroentangled web of claim 2, wherein the short natural fibers have a length of about 1–27 mm.

* * * * *